US012709164B2

(12) United States Patent
Bartels et al.

(10) Patent No.: US 12,709,164 B2
(45) Date of Patent: Aug. 18, 2026

(54) METHOD FOR OPERATING A VEHICLE

(71) Applicants: Volkswagen Aktiengesellschaft, Wolfsburg (DE); Audi Aktiengesellschaft, Ingolstadt (DE)

(72) Inventors: Arne Bartels, Wolfsburg (DE); Frank Baerecke, Wolfsburg (DE); Hauke Schlimme, Braunschweig (DE); Kilian Foerster, Beilgries (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 90 days.

(21) Appl. No.: 18/806,683

(22) Filed: Aug. 15, 2024

(65) Prior Publication Data

US 2024/0399891 A1 Dec. 5, 2024

Related U.S. Application Data

(63) Continuation of application No. PCT/EP2023/053895, filed on Feb. 16, 2023.

(30) Foreign Application Priority Data

Feb. 17, 2022 (DE) ..................... 10 2022 103 802.5

(51) Int. Cl.
*B60L 15/20* (2006.01)
*H02P 3/22* (2006.01)

(52) U.S. Cl.
CPC ............ *B60L 15/2027* (2013.01); *H02P 3/22* (2013.01); *B60L 2240/421* (2013.01); *B60L 2240/642* (2013.01); *B60L 2250/28* (2013.01)

(58) Field of Classification Search
None
See application file for complete search history.

(56) References Cited

U.S. PATENT DOCUMENTS 5,184,049 A * 2/1993 Kiuchi ...................... H02P 3/22 318/362
2004/0145328 A1* 7/2004 Hauf ......................... H02P 3/22 318/372

(Continued)

FOREIGN PATENT DOCUMENTS

DE 102009047612 A1 6/2011
DE 102012002023 A1 12/2012

(Continued)

OTHER PUBLICATIONS

Office Action for German Patent Application No. 102022103802.5 dated Oct. 13, 2022.

(Continued)

*Primary Examiner* — Daniel L Greene
(74) *Attorney, Agent, or Firm* — Muncy, Geissler, Olds & Lowe, P.C.

(57) ABSTRACT

A method for operating a vehicle when stopping the vehicle and/or when holding the vehicle at a standstill after a failure in a brake system, for example, a brake-by-wire system of the vehicle. The vehicle can have an electric motor. The method has the steps of: carrying out a deceleration, in particular a regenerative deceleration of the vehicle, the deceleration being initiated automatically, and switching the electric motor to an active short-circuit after a regenerative deceleration of the vehicle in order to prevent the vehicle from rolling.

13 Claims, 2 Drawing Sheets

(56) References Cited

U.S. PATENT DOCUMENTS

| | | | | |
|---|---|---|---|---|
| 2017/0008401 | A1 | 1/2017 | Stemmer | |
| 2021/0075286 | A1* | 3/2021 | Graßl | H02K 3/28 |
| 2021/0245606 | A1* | 8/2021 | Baer | B60T 11/04 |

FOREIGN PATENT DOCUMENTS

| | | | |
|---|---|---|---|
| DE | 102012223867 | A1 | 6/2014 |
| DE | 102017209655 | A1 | 12/2018 |
| DE | 102018217740 | A1 | 12/2019 |

OTHER PUBLICATIONS

International Preliminary Report on Patentaility for International Application No. PCT/EP2023/053895 dated Aug. 20, 2024.
International Search Report for International Application No. PCT/EP2023/053895 dated Jun. 9, 2023.

* cited by examiner

METHOD FOR OPERATING A VEHICLE

This nonprovisional application is a continuation of International Application No. PCT/EP2023/053895, which was filed on Feb. 16, 2023, and which claims priority to German Patent Application No. 10 2022 103 802.5, which was filed in Germany on Feb. 17, 2022, and which are both herein incorporated by reference.

BACKGROUND OF THE INVENTION

Field of the Invention

The invention relates to a method for operating a vehicle when stopping the vehicle and/or when holding the vehicle at a standstill, for example after a failure in a brake system, in particular a brake-by-wire system, of the vehicle. The invention also relates to a corresponding use of an electric motor of a vehicle. Further, the invention relates to a corresponding computer program product. Furthermore, the invention relates to a corresponding control unit for carrying out a corresponding method. In addition, the invention relates to a corresponding vehicle.

Description of the Background Art

Brake-by-wire systems are generally known. Brake-by-wire systems can provide several advantages for conventional vehicles as well as for automated (Level 4 according to SAE definition) to autonomous (Level 5 according to SAE Definition) vehicles.

For automated vehicles, brake-by-wire systems can make it possible to fold away and/or retract the foot pedal mechanism. This creates more space for the driver, who becomes a passenger during the fully automated journey, for activities such as sleeping, reading the newspaper, surfing the Internet, etc. In addition, the mechanical decoupling between the brake pedal and brake actuator avoids unintentional incorrect operation during fully automatic driving: Even if the brake pedal were not retracted, an accidental touch of the brake pedal during fully automated driving (e.g., the driver is asleep) does not lead to an unwanted vehicle reaction. Autonomous vehicles do not require a driver, so a brake-by-wire system is mandatory.

For conventional vehicles, brake-by-wire systems can be used to make it easier to get in and out of the car by folding away and/or retracting the foot pedal mechanism. The braking behavior can be individually adapted and customized to the driver. Electronic adjustability of the braking characteristic (braking torque as a function of pedal travel and/or pedal force) allows it to be changed in such a way that the driver perceives the braking behavior as softer or harder, sporty or comfortable, direct or dampened. These settings can be transferred individually from vehicle to vehicle for the driver.

There are also potential environmental benefits. By increasing the clearance between the brake disk and the brake pad, residual braking torques can be reduced. This enables a reduction in CO2 and brake dust emissions as well as an increase in the battery-electric range.

There are also possible advantages in terms of safety. By breaking the mechanical connection via a push/pull rod between the brake pedal and the brake control system, pedal intrusion can be reduced in the event of a crash.

In addition, the vehicles can be designed in a simple way to make them accessible to the disabled. For people with a physical disability which makes it difficult or impossible to operate the pedals, alternative operating concepts can be offered without costly vehicle conversions if by-wire brake systems are installed as standard.

Furthermore, the wide range of variants can be reduced. An almost uniform pedal mechanism can now be installed across all vehicle classes.

With brake-by-wire systems, the mechanical fallback level by the driver is eliminated. In order to enable a vehicle with a brake-by-wire system to continue driving in a degraded driving mode (e.g., reduced speed) and/or limited driving mode (e.g., only for a limited time or a limited distance) after a first fault, a fallback level can be provided.

From DE 10 2009 047 612 A1 a method for braking a vehicle with an electric drive motor is known. In this case, the electric drive motor is transferred into generator mode in the presence of a malfunction of the mechanical brake system to brake the vehicle.

From DE 10 2018 217 740 A1, which is incorporated herein by reference, a method for stopping a motor vehicle during a stopping phase is known. In order to keep the motor vehicle in the holding position during a holding phase, the stator winding is short-circuited completely or at least in sections by means of a short circuit.

Furthermore, a method is known from DE 10 2017 209 655 A1, which is incorporated herein by reference, and in which, in the event of a malfunction of the braking device, the drive motor is used at least temporarily to hold the motor vehicle in its position.

A disadvantage of conventional systems is that after a second fault and/or after the fallback of the primary and secondary brake system, the onward journey and safety in the operation of the vehicle can no longer be guaranteed.

If the eventual case, albeit unlikely, occurs that both the primary and secondary brake systems fail during vehicle operation, the present method may provide for the vehicle to be regeneratively decelerated automatically, if possible to a standstill. Regenerative deceleration can also be referred to as recuperation. Regenerative deceleration to a standstill can also be understood as regenerative-engine deceleration to a standstill. In this process, the vehicle is first regeneratively decelerated to the low-speed range, and then by the engine from the low-speed range to a standstill.

In vehicles with an electronic parking brake, the electronic parking brake is also controlled via the primary and secondary brake system. However, if both brake systems have failed, and in particular a regenerative deceleration to a standstill has been carried out, it is no longer possible to secure the vehicle against rolling using the electronic parking brake.

SUMMARY OF THE INVENTION

It is therefore an object of the invention to provide an improved method for operating a vehicle when stopping the vehicle and/or when holding the vehicle at a standstill, for example after a failure in a brake system, in particular a brake-by-wire system, of the vehicle. In particular, the object of the invention is to provide a method for operating a vehicle which enables increased safety in the operation of the vehicle and which creates improved customer comfort. Furthermore, the object of the invention is to provide an advantageous use of an electric motor of a vehicle. Furthermore, it is the object of the invention to provide a corresponding computer program product. Furthermore, it is the object of the invention to provide a corresponding control unit. In addition, it is the object of the invention to provide a corresponding vehicle.

The object of the invention is achieved, in an example, by a method for operating a vehicle when stopping the vehicle and/or when holding the vehicle at a standstill, e.g., after a failure in a brake system, in particular a brake-by-wire system, of the vehicle having the features of the independent process claim. Furthermore, the invention relates to a corresponding use of an electric motor of a vehicle having the features of the independent use claim. The object of the invention is also achieved by: a method for operating a vehicle when stopping the vehicle and/or when holding the vehicle at a standstill, e.g., after a failure in a brake system, in particular a brake-by-wire system, of the vehicle having the features of the secondary independent process claim, which is a real alternative to the solution according to the independent process claim. Furthermore, the invention relates to a corresponding use of an electric motor of a vehicle having the features of the independent use claim. Furthermore, the invention relates to a corresponding computer program product having the features of the independent product claim. Furthermore, the invention relates to a corresponding control unit having the features of the independent device claim. In addition, the invention relates to a corresponding vehicle having the features of the ancillary device claim. In this context, features described in connection with individual aspects and/or embodiments of the invention naturally also apply in connection with the other aspects and/or embodiments, and vice versa in each case, so that the disclosure is or can always be mutually referred to with regard to the individual aspects of the invention and/or embodiments.

The invention provides: a method for operating a vehicle when stopping the vehicle and/or when holding the vehicle at a standstill, e.g., after a failure in a brake system, especially a brake-by-wire system, of the vehicle. The vehicle can include an electric motor, e.g., a synchronous motor, in particular a permanently excited, preferably permanent-magnet synchronous motor, or an asynchronous motor, and at least one battery, e.g., a high-voltage battery, in particular a traction battery. The method comprises the steps of: deceleration, in particular a regenerative deceleration, of the vehicle, which is preferably initiated automatically when, for example, a critical second fault in a brake system, such as a brake-by wire system of the vehicle has been detected and/or when a non-critical fault in the brake system was not resolved; and/or switching the electric motor to an active short circuit, preferably after a regenerative deceleration of the vehicle, in order to prevent the vehicle from rolling.

The vehicle in which the inventive method can be used can have, for example, a traction battery, e.g., a high-voltage battery that can be operated with DC voltages from approx. 60 V to approx. 1.5 kV. The vehicle may also have an electric motor. Furthermore, the vehicle can have at least one central control unit. Furthermore, the vehicle can have a driver-vehicle interface, e.g., in the form of an interactive input and output unit, e.g., comprising a display, an acoustic output device, etc.

The vehicle in which the inventive method can be used can preferably be designed as a fully automated vehicle (Level 4 according to the SAE definition) or an autonomous vehicle (Level 5 according to the SAE definition).

If the driver is in control, then the brake request can come from the driver, e.g., by pressing an electronic brake pedal. If the vehicle has vehicle guidance, then the brake request comes from the vehicle.

In the case of a fully automated vehicle (Level 4 according to the SAE definition), the driver can become a passenger or vehicle user. In a fully automated vehicle, a driver-vehicle interface may be provided. In an autonomous vehicle (Level 5 according to the SAE definition), no driver is envisaged. Only users are envisaged there. In an autonomous vehicle, a user vehicle interface may be provided.

The vehicle in which the method according to the invention can be used may have a brake system, a so-called brake-by-wire system, in which detection devices and implementation devices for a brake request (which can come from the driver or the vehicle, for example) can be mechanically decoupled from each other. The brake-by-wire system can have the following subsystems: a first (or primary) brake system (so-called autonomous brake system) to provide a brake function, which is autonomously designed and/or is supplied with electrical energy via a first (or primary) power supply; a second (or secondary) brake system (so-called autonomous brake system) to provide a first fallback level for the brake function, which is autonomously designed and/or is supplied with electrical energy via a second (or secondary) power supply; and/or a third brake system (an at least partially indirect and/or functionally implemented brake system) to provide a second fallback level for the brake function, in particular via an electromechanical drive system of the vehicle, e.g., by means of a regenerative deceleration.

The brake-by-wire system provides two redundant autonomous brake systems, which are designed to be self-sufficient or independent and can function independently of each other as well as from other functional systems of the vehicle.

Each of these two brake systems can also have several subsystems, such as a brake request detection device (or a detection device for detecting the brake request) and a brake request implementation (or brake request implementation for implementing the brake request). In both autonomous brake systems, the brake request can be transferred from the respective detection to the respective implementation via a corresponding transmission system, such as a bus system or a data bus, e.g., with a CAN or SENT protocol.

The respective brake request detection can be designed as an electronic brake pedal. The operation of the brake pedal by the driver can, for example, be detected via force and/or displacement sensors or the like. A control electronics of the brake request detection, comprising, e.g., appropriate electronics and/or software, can passively receive the sensor data, actively query it and, if necessary, evaluate it. The control electronics of the respective brake request detection can also transmit the sensor data and/or the results of the evaluation via an associated transmission system to the corresponding brake request implementation. The respective brake request implementation can also include control electronics, comprising, e.g., appropriate electronics and/or software. The evaluation of sensor data from the respective brake request detection can be carried out in the control electronics of the brake request detection and/or in the control electronics of the brake request implementation. The control electronics of the brake request detection and the control electronics of the brake request implementation can be provided as separate control electronics or as a common control electronics.

At least one or every brake request implementation can be designed as a so-called "wet" by-wire brake system. The respective brake request implementation can have an electric motor, various sensors and hydraulic valves. In the brake calipers of the wheels there are brake pads, which are pressed against the brake disks by hydraulic pressure. A control electronics of the brake request implementation and the brake calipers are interconnected via hydraulic lines (for hydraulic valves). The control electronics control the electric motor to generate a certain hydraulic pressure and thus a certain braking torque, which corresponds to the detected brake request. The hydraulic valves can be used to set, adjust and/or modulate the pressure on the four wheels.

At least one or every brake request implementation can be designed as a so-called "dry" by-wire brake system. The respective brake request implementation can include an electric motor, various sensors and mechanical actuators. In the brake calipers of the wheels there are brake pads, which are pressed to the brake disks via electric motors and mechanical actuators. The control electronics and the brake calipers are interconnected via power lines (for the electric motors) and data lines (for the sensors). The control electronics control the electric motors in the brake calipers to generate a specific braking torque that corresponds to the brake request. The braking torque on the four wheels can be modulated via a suitable control of the electric motors.

In addition to the first and second autonomous brake systems, which possess their own long-term power supply, a short-term power supply may also be provided. The third brake system uses the regenerative electric motor and the control unit of the electric motor. The electric motor is connected directly to the high-voltage battery, in particular the traction battery. The high-voltage battery, in particular the traction battery, feeds the first power supply and the second power supply. The control unit of the electric motor is connected to the first power supply and to the short-term power supply. The short-term power supply can be part of the third brake system. The respective long-term power supply can be provided, for example, via a DC/DC converter, which can be connected to a corresponding high-voltage battery. The short-term power supply can be provided, for example, by a low-voltage battery and/or a supercapacitor, a so-called ultra-cap, or the like. The operating voltage of the low-voltage battery can be in the range between 12 V and 14 V.

If a so-called "wet" by-wire brake system is used, advantageously this brake system, which is equipped with hydraulic valves, can be connected to the short-term power supply. This means that even if the primary and secondary long-term power supply fail at the same time, basic brake functions such as braking the vehicle to a standstill, as well as safety-relevant brake control functions, such as ABS and ESC, are maintained, at least for a short time.

The third brake system can be provided, at least in part, as an indirect or dependent and/or functionally implemented or indirect brake system (or deceleration system) to provide a second fallback level for the brake function, e.g., via another system of the vehicle essential for its functioning, such as an electromechanical drive system, e.g., by a regenerative delay. An electric motor of the electromechanical drive system, which is operated in a generator mode for a regenerative deceleration, acts as a third brake request implementation (or implementation device for implementing the brake request).

The third brake system can advantageously include a third brake request detection. The brake request detection can be carried out, for example, by a button of an electronic parking brake. The button can be connected directly to the electronics of the primary and secondary brake request conversion via a signal line (i.e., no data bus). The third brake request detection can deliver the results of the detection to the first and/or second autonomous brake system.

The brake system can have its own control unit, which can be in a communication connection with a central control unit of the vehicle. In addition, the brake system may have a control unit that may be integrated into the vehicle's central control unit in terms of software and/or hardware.

Because the subsystems have multiple components, the failure of one of these components can lead to the failure of the respective subsystem. Failure of the primary or secondary brake request detection can lead to a failure of electronics, a sensor, or software, for example. A failure of the primary or secondary brake request implementation can lead to a failure of an electronics, a sensor, a software or an electric motor, for example. The failure of the primary or secondary power supply can lead to a failure of a power line, a battery, a DC/DC converter, a fuse, electronics or software, for example. Failure of the primary or secondary brake system can also be caused by the failure of a data bus, such as the failure of the data bus between brake request detection and brake request implementation.

In the case of failure of at least one brake system, one can speak of a failure in the brake system or brake-by-wire system, whereupon the method according to the invention can be initiated in an advantageous manner.

The control unit can receive diagnostic messages, "keep-alive" signals, and/or fault conditions from both the first and second autonomous brake systems, as well as from the third indirect brake system, as well as from the first and second power supply as well as from the third power supply, e.g., via a suitable transmission system, such as a bus system or a data bus, e.g., with a CAN or SENT protocol, e.g., via CAN bus, and/or wireless transmission, such as radio transmission. From the high-voltage battery, in particular the traction battery, the control unit can receive the operating parameters, such as the state of charge and the temperature, e.g., via a suitable transmission system, such as a bus system or a data bus, e.g., with a CAN or SENT protocol, e.g., via CAN bus, and/or wireless transmission, such as, e.g., a radio transmission.

Based on these input signals (diagnostic messages and/or fault conditions and/or operating parameters), the control unit can decide whether a regenerative deceleration is possible at all and to what extent and/or up to a standstill. In addition, the control unit can decide whether the onward journey is possible after a first or second fault in the respective brake systems and/or in the power supply. In addition, the control unit can decide whether automatic braking and/or emergency braking must be requested and/or whether automatic braking and/or emergency braking must be carried out regeneratively by means of the electric motor and/or via the first brake request implementation and/or the second brake request implementation using the brake calipers.

The control unit can request a control unit of the electric motor to perform a regenerative deceleration. The control unit can request a deceleration using the brake calipers from the first brake request implementation and/or from the second brake request implementation. In addition, the control unit can control the driver-vehicle interface to inform and/or warn the driver about the faults and/or to make a suggestion for further operation of the vehicle, such as visiting a repair shop. Also, the control unit can inform the driver about the remaining driving distance and/or the remaining driving time.

The control unit of the brake-by-wire system and the control unit of the electric motor can be provided as a single unit (e.g., integrated in the vehicle's central control unit) or as two separate control units.

After a first fault in the brake system, in particular in the brake-by-wire system, the first fault can be assessed with regard to whether it is critical or non-critical for the vehicle journey to continue in the safest way possible.

A first fault in a brake-by-wire system is critical if, after a subsequent second fault, the vehicle cannot be decelerated to a standstill either by the driver (detection or implementation of the brake request is no longer possible) or automatically. It is then no longer possible to continue the journey.

A first fault in a brake-by-wire system is not critical if, after a subsequent second fault, the vehicle can be decelerated either by the driver (detection and implementation of the brake request is still possible) or automatically to a standstill. A continuation of the journey is then possible at least to a limited extent.

Example: After a failure of the primary detection device for a brake request, after a subsequent failure of the secondary detection device for a brake request, the brake request was able to be detected via the third detection device (e.g., a button on the electronic parking brake). Consequently, the first fault-failure of the primary detection device for a brake request is not critical.

Example: After a failure of the primary implementation device for a brake request, after a subsequent failure of the secondary implementation device for a brake request, it would still be possible to automatically decelerate to a standstill via a regenerative deceleration-provided that the state of charge and/or temperature of the high-voltage battery, in particular the traction battery, allows for this—i.e., the traction battery is not too fully charged and not too cold, for example. Consequently, the first fault-failure of the primary implementation device for a brake request is not critical if the state of charge and/or temperature of the high-voltage battery, in particular the traction battery, allows for a regenerative deceleration to a standstill.

Otherwise, this first fault is critical. A failure of the secondary implementation device for a brake request can also be assessed as non-critical or critical using the same logic.

Example: After a failure of the primary long-term power supply, after a subsequent failure of the secondary long-term power supply, both the detection device and the implementation device of the brake request, as well as the automatic deceleration to a standstill, would be able to be carried out with the help of the short-term power supply. Consequently, a first fault-failure of the primary long-term power supply is not critical. A first fault-failure of the secondary long-term power supply can also be assessed as non-critical using the same logic.

The following defines when a secondary fault is critical or non-critical in a brake-by-wire system and/or steer-by-wire system, as well as examples of critical and non-critical secondary faults.

A second fault in a brake-by-wire system is critical if, after a subsequent third fault, the vehicle cannot either be decelerated to a standstill by the driver (detection or implementation of the brake request is no longer possible) or automatically. It is then no longer possible to continue the journey.

A second fault in a brake-by-wire system is not critical if, after a subsequent third fault, the vehicle can be decelerated either by the driver (detection or implementation of the brake request possible) or automatically to a standstill. A continuation of the journey is then possible to a limited extent.

Example: After failure of the primary brake system (failure of the primary brake request detection or implementation, or the primary long-term power supply), the secondary brake system also fails (failure of the secondary brake request detection or implementation, or of the secondary long-term power supply). If a third fault in another system were to now prevent the regenerative deceleration from coming to a standstill, the vehicle would not be able to decelerate to a standstill either with the help of the driver or automatically. Consequently, a second fault-failure of the secondary brake system with a previous first fault-failure of the primary brake system is critical.

Example: After a failure of the primary brake request detection, the primary brake request implementation also fails. If the secondary brake system were to fail due to a third fault (e.g., failure of the secondary brake request detection or implementation, or of the secondary long-term power supply), then the vehicle could be automatically regeneratively decelerated to a standstill. If, on the other hand, a third fault in another system were to prevent the regenerative deceleration, then the vehicle could be decelerated further to a standstill by the driver via the secondary brake system. Consequently, a failure of the primary brake request implementation as a second fault with a previous failure of the primary brake request detection as a first fault is not critical.

The criticality of further combinations of first and second faults can be assessed according to the same logic.

Advantageously, when evaluating the first fault and/or the second fault, at least one operating parameter of a high-voltage battery, in particular a traction battery, of the vehicle can comprise, for example, a state of charge, temperature, etc.

In this way, it can be assessed whether the second fallback level for the brake function or the third level for the brake function, or in other words a regenerative deceleration, can be ensured.

Furthermore, after the occurrence of a critical first fault, at least one of the following actions can be performed during vehicle operation, in particular in the specified order: issuing a second warning to a vehicle user with a request for action, in particular to stop the vehicle; setting a timer (approx. 1 min) to implement the request by the vehicle user according to the second warning; and/or automatic deceleration (in particular moderate deceleration, preferably via a regenerative deceleration of the vehicle, e.g., with an acceleration of approx. 1 to 2 $m/s^2$) and/or braking of the vehicle, in particular to a standstill, if the request according to the second warning was not implemented by the vehicle user after the timer has expired.

Furthermore, after the occurrence of a non-critical first fault, at least one of the following actions can be carried out during vehicle operation, in particular in the specified order: issuing a first warning to a vehicle user with a recommendation for action, in particular to visit a repair shop; automatic deceleration (in particular moderate deceleration, preferably via a regenerative deceleration of the vehicle, e.g., with an acceleration of approx. 1 to 2 $m/s^2$) and/or braking of the vehicle, in particular to a limited speed, preferably after the non-critical first fault has been detected; operation of the vehicle in a limited operating mode, in particular with a limited speed, e.g., 130 km/h, preferably for a limited time, e.g., 40 min, and/or a limited distance, e.g., 25 km; issuing a second warning to a vehicle user with a request for action, in particular to stop the vehicle; setting a timer to implement the request by the vehicle user after the second warning; and/or automatic deceleration (in particular moderate deceleration, preferably by means of a regenerative deceleration of the vehicle F, e.g., with an acceleration of approx. 1 to 2 $m/s^2$) and/or braking of the vehicle, in particular to a standstill, if the first fault detected has not been rectified after the limited time and/or distance has elapsed.

In addition, after a critical first fault occurs, at least one of the following actions can be performed during vehicle operation, in particular in the specified order: monitoring of the detected non-critical first fault for conversion to a critical first fault; recording an implementation of the detected non-critical first fault into a critical first fault; issuing a second warning to a vehicle user with a request for action, in particular to stop the vehicle; setting a timer (approx. 1 min) to implement the request by the vehicle user according to the second warning; and/or automatic deceleration (in particular moderate deceleration, preferably via a regenerative deceleration of the vehicle, e.g., with an acceleration of approx. 1 to 2 $m/s^2$) and/or braking of the vehicle, in particular to a standstill, if the request according to the second warning was not implemented by the vehicle user after the timer has expired.

In addition, after the occurrence of a non-critical first fault and a critical second fault, at least one of the following actions can be performed during vehicle operation, in particular in the specified order: issuing a second warning to a vehicle user with a request for action, in particular to stop the vehicle; setting a timer (approx. 1 min) to implement the request by the vehicle user according to the second warning; and/or automatic deceleration (in particular moderate deceleration, preferably via a regenerative deceleration of the vehicle, e.g., with an acceleration of approx. 1 to 2 $m/s^2$) and/or braking of the vehicle, in particular to a standstill, if the request according to the second warning was not implemented by the vehicle user by the time the timer has expired.

In addition, after the occurrence of a non-critical first fault and a non-critical second fault, at least one of the following actions can be performed during vehicle operation, in particular in the specified order: reissuing a first warning to a vehicle user with a recommendation for action, in particular to visit a repair shop; operating the vehicle in a limited operating mode, especially with a limited speed, e.g. 130 km/h, preferably for a limited time, e.g., 40 min, and/or a limited distance, e.g., 25 km, preferably measured since the detection of the non-critical first fault; and/or automatic deceleration (in particular moderate deceleration, preferably by means of a regenerative deceleration of the vehicle, e.g., with an acceleration of approx. 1 to 2 $m/s^2$) and/or braking of the vehicle, in particular to a standstill, if the first fault and the second fault detected have not been resolved after the expiry of the limited time and/or distance.

The invention exemplary provides two solutions for stopping the vehicle or for holding the vehicle at a standstill, especially after the function "regenerative deceleration" has been activated, e.g., as a second fallback level in a brake-by-wire system. This function can be activated then, for example, when the primary brake system and the secondary brake system have failed. This can be referred to as a critical fault, especially a critical second fault, in the brake-by-wire system. In vehicles with electronic parking brakes, the electronic parking brake is also controlled via the primary and secondary brake system. Consequently, after the regenerative deceleration to a standstill, it is often no longer possible to secure the vehicle against rolling using the electronic parking brake. However, the "regenerative deceleration" function can also be activated if after a first fault the driver does not comply with the request of selecting a repair shop or resolving the fault.

In the context of the invention, one can speak of a failure in a brake system, in particular a brake-by-wire system, of the vehicle, at least if a critical secondary fault in the brake system or in the brake-by-wire system of the vehicle has been detected or if a non-critical fault in the brake system has not been resolved.

The invention suggests that the electric motor of the vehicle makes sure the vehicle is prevented from rolling. For this purpose, the electric motor, especially designed as a permanent magnet or permanent-magnet synchronous motor, can be switched to an active short circuit, a so-called AKS. Switching to the active short circuit can advantageously take place below a certain speed limit, the so-called AKS speed limit. The AKS torque then prevents the vehicle from rolling.

Active short circuit or AKS can mean: The stator windings of the synchronous motor are short-circuited at the connecting cables, e.g., by a switch, such as an electronic switch (e.g., a field-effect transistor, such as a MOSFET transistor), which may be provided, e.g., in power electronics.

The AKS torque can mean: When the vehicle rolls forwards or backwards, the movement of the permanent magnet in the rotor of the synchronous motor induces a voltage in the windings of the stator. A current now flows in the short-circuited windings of the stator, which leads to an AKS torque, which counteracts the direction of rotation of the synchronous motor, and thus leads to the braking of the vehicle.

The speed limit or the AKS speed limit can mean: The AKS torque rises steeply with the speed of the electric motor, then reaches a maximum, and then decreases steadily. Below the AKS limit speed, the AKS torque is then so low that it is no longer sufficient to secure the vehicle against rolling.

The advantage here is that if the vehicle should roll from a standstill after the regenerative deceleration, then the maximum speed of the vehicle when rolling is limited to a few km/h by the active short circuit, preferably below walking speed, preferably below 1 km/h.

Another advantage is that after the regenerative deceleration to a standstill, i.e., hardly any or no electricity is consumed, the vehicle is not actively held at a standstill.

Furthermore, it may be provided that a regenerative deceleration is carried out to decelerate the vehicle, the deceleration preferably being initiated automatically, in particular if a critical second fault in a brake system, preferably a brake-by-wire system, of the vehicle has been detected, or if a non-critical first fault in a brake system, preferably a brake-by-wire system, of the vehicle has not been resolved. This may mean that both a primary brake system and the vehicle's secondary brake system have failed, or that a failure of a primary brake system or a secondary brake system has not been resolved or the like. Advantageously, the electric motor can be switched to the active short circuit after a regenerative deceleration of the vehicle. In this way, the advantages of preventing rolling can be made possible with the aid of the electric motor if an electronic parking brake is not available for the vehicle or cannot be realized with the aid of the brake system and the secondary brake system.

As mentioned above, the electric motor can be switched to an active short circuit below a certain speed limit of the electric motor, in particular a so-called AKS speed limit. The speed limit of the electric motor for switching to the active short circuit can advantageously be determined depending on the weight, in particular the load weight, of the vehicle and/or the topology, in particular the slope, of the road surface on which the vehicle is brought to a stop. In this way, preventing the vehicle from rolling can keep the latter at one rolling speed with the aid of the electric motor.

When the electric motor is switched to an active short circuit, stator windings of the electric motor can be short-circuited to connecting cables, in particular by a switch, preferably an electronic switch, preferably a field-effect transistor.

Advantageously, when switching the electric motor to an active short circuit, the rolling speed of the vehicle can be limited to a few km/h, especially below a walking speed, preferably below 1 km/h. Due to the low rolling speed, the vehicle can be used safely despite the failure of the brake system. Other road users can safely avoid the vehicle, so that the vehicle can almost be perceived as a stationary obstacle.

Advantageously, preventing the vehicle from rolling can be done passively by switching the electric motor to the active short circuit, in particular without energizing the stator windings of the electric motor.

In principle, it is conceivable that after switching the electric motor to the active short circuit, the accelerator pedal operation is switched off, interrupted or not permitted. In this way, it can be prevented that the driver switches off the rollaway protection with the aid of the electric motor and accelerates the vehicle again.

In addition, it is conceivable that the active short circuit of the electric motor is interrupted during operation of the accelerator pedal. In this way, the driver can be allowed to operate the accelerator pedal, at least in unusual situations, e.g., "rolling uphill" backwards, so as not to confuse the driver and also to make these unusual situations easier or more intuitive to control.

Advantageously, the accelerator pedal operation can be switched off or allowed depending on the topology, in particular incline, of the roadway on which the vehicle is brought to a stop. In principle, it is conceivable that the accelerator pedal operation may be permitted on a sloping roadway, and that the accelerator pedal operation is not permitted on a rather flat or uphill roadway.

It is also conceivable that after the electric motor has been switched to the active short circuit, a steering function of the vehicle is permitted. In this way, the driver can be given the opportunity to avoid obstacles.

The invention further provides: the use of an electric motor of a vehicle in an active short circuit to prevent the vehicle from rolling. In this way, the electric motor of the vehicle can be used in an advantageous manner to provide passive rollaway protection. This can be particularly advantageous when an electronic parking brake of the vehicle is not available or cannot be implemented using the brake system and the secondary brake system.

The invention also provides: a method for operating a vehicle when stopping a vehicle and/or when holding the vehicle at a standstill, e.g., after a failure in a brake system, in particular a brake-by-wire system, of the vehicle. The vehicle can have an electric motor, e.g., a synchronous motor, in particular a permanently excited, preferably permanent-magnet synchronous motor, or an asynchronous motor, and at least one battery, e.g., a high-voltage battery, in particular a traction battery. The method comprises the steps of: deceleration, in particular regenerative deceleration, of the vehicle, the deceleration preferably being initiated automatically, when, for example, a critical second fault in a brake system, such as a brake-by wire system of the vehicle was detected and/or when a non-critical fault in the brake system has not been resolved; and/or energizing a stator winding of the electric motor, possibly with phase switching of the stator windings of the electric motor to prevent the vehicle from rolling.

In this way, the vehicle can be prevented from rolling with the aid of the electric motor, which works when energized. This makes it possible to actively stop the vehicle and/or hold the vehicle at a standstill. The electrical energy is consumed in the process. However, this enables high braking torques. This represents an alternative solution to the method described above, in which it is possible to passively stop the vehicle and/or hold the vehicle at a standstill.

The invention also provides: a use of an electric motor of a vehicle by energizing a stator winding of the electric motor, possibly with phase switching of the stator windings of the electric motor, in order to prevent the vehicle from rolling. In this way, too, the electric motor of the vehicle can be used to provide active rollaway protection. This can also be advantageous if an electronic parking brake of the vehicle is not available or cannot be implemented by using the brake system and the secondary brake system, and if sufficient energy is available, e.g., the at least one battery, such as the high-voltage battery or the traction battery is fully charged.

The invention further provides: a computer program product, comprising commands which, when the computer program product is executed by a computer, cause the latter to perform any one of the methods described above. With the help of the inventive computer program product, the same advantages can be achieved as described above in connection with the respective inventive method. Reference is made in full to these advantages here.

The invention further provides: a control unit, having a computing unit and a memory unit, in which a code is stored which, when executed, at least in part, by the computing unit, performs any one of the methods described above. The same advantages that were described above in connection with the respective inventive method can be achieved with the aid of the inventive control unit. Reference is made in full to these advantages here.

The control unit for carrying out the respective method according to the invention can be designed as a separate control unit or integrated in terms of software and/or hardware in a central control unit of the vehicle and/or in a control unit for an electric motor of the vehicle. The control unit for carrying out the respective method according to the invention can also include a control unit for the brake system.

The invention also provides: a vehicle having a corresponding control unit. With the aid of the vehicle according to the invention, the same advantages can be achieved that were described above in connection with the respective method according to the invention. Reference is made in full to these advantages here.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

FIGS. 1 to 4 serve to describe a method within the scope of the present disclosure. The method is used to operate a vehicle F when stopping the vehicle F and/or when holding the vehicle F at a standstill, e.g., after a failure in a brake system 100, in particular a brake-by-wire system, of the vehicle F. The method is thus used to prevent the vehicle F from rolling.

Figure 1:
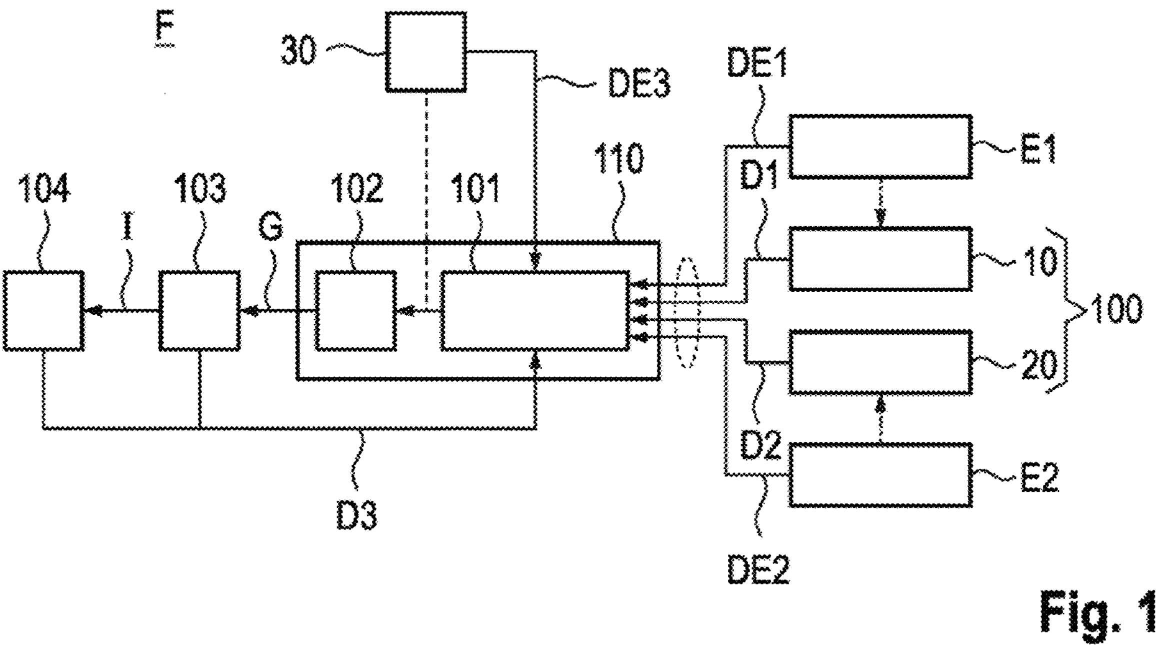
FIG. 1 shows a schematic representation of a brake system.

As is indicated in FIG. 1, the vehicle F can have an electric motor 103, e.g., a synchronous motor, in particular a permanently excited, preferably permanent-magnet synchronous motor, or an asynchronous motor, and at least one battery 104, e.g., a high-voltage battery, in particular a traction battery.

The method provides the following method steps/actions of: deceleration, in particular a regenerative deceleration, of the vehicle F, the deceleration preferably being initiated automatically, when, for example, a critical second fault in a brake system 100 or a brake-by-wire-system of the vehicle F has been detected; and/or when a non-critical first fault in the brake system 100 has not been resolved, switching the electric motor 103 to an active short circuit AKS, preferably after a regenerative deceleration of the vehicle F to prevent the vehicle F from rolling.

As is further indicated in FIG. 1, the vehicle F, in which the method according to the invention can be used, can have a brake system 100, a so-called brake-by-wire system, in which detection devices and implementation devices for a brake request (which can come from the driver or the vehicle, for example) can be mechanically decoupled from each other. The brake system 100 can have the following subsystems: a first (or primary) brake system 10 (so-called autonomous brake system) to provide a brake function, which is autonomously designed and/or is supplied with electrical energy via a first (or primary) power supply E1; a second (or secondary) brake system 20 (so-called autonomous brake system) to provide a first fallback level for the brake function, which is autonomously designed and/or is supplied with electrical energy via a second (or secondary) power supply E2; and a third brake system (at least partially indirect and/or functionally implemented brake system) to provide a second fallback level for the brake function, in particular via an electromechanical drive system 103 of the vehicle, e.g., by means of a regenerative deceleration 30.

In the brake system 100, two redundantly maintained autonomous brake systems 10, 20 are provided, which are designed to be self-sufficient or independent and which can function independently of each other and of other functional systems of the vehicle F.

Each of these two brake systems 10, 20 can also have several subsystems, such as, e.g., one brake request detection (or detection device for detecting the brake request) and one brake request implementation (or implementation device for implementing the brake request). In both autonomous brake systems, the brake request can be transferred from the respective detection to the respective implementation via a corresponding transmission system, such as a bus system or a data bus, e.g., with a CAN or SENT protocol. The individual subsystems are not shown for reasons of simplicity only.

The third brake system can be provided, at least in part, as an indirect or dependent and/or functionally implemented or indirect brake system (or deceleration system) to provide a second fallback level for the brake function, e.g. via another system essential to the function of the vehicle F, such as an electromechanical drive system 103, 104, e.g., by a regenerative deceleration. An electric motor 103 of the electromechanical drive system 103, 104, which is operated in a generator mode G for the regenerative deceleration 30, acts as a third brake request implementation (or implementation device for implementing the brake request). The electric motor 103 generates a charging current I for the at least one battery 104, comprising, e.g., a high-voltage battery, such as a traction battery, and possibly at least one other auxiliary battery.

Furthermore, the brake system 100 can have a control unit 101, which may be integrated in terms of software and/or hardware into the central control unit of the vehicle F, as shown schematically in FIG. 1. However, the brake system 100 can also have its own control unit 101, which can be in a communication connection with a central control unit of the vehicle F.

Since the subsystems of the first brake system 10 and the second brake system 20 have several components, the failure of one of these components can lead to the failure of the respective system 10, 20. In the event of a failure of at least one brake system 10, 20 one can speak of a failure in the brake system 100 or brake-by-wire system, according to which the inventive method can be initiated.

The control unit 101 of the brake system 100 can transmit input signals D1, D2, D3. DE1, DE2, DE3 (diagnostic messages, "keep-alive" signals and/or fault conditions) received from the first and second autonomous brake systems 10, 20 and from the third indirect brake system 30 as well as from the first and second power supply E1, E2 and from the third power supply E3, e.g., via a suitable transmission system, such as, e.g., a bus system or a data bus, e.g., with a CAN or SENT protocol, e.g., via CAN bus, and/or a wireless transmission, such as a radio transmission. The control unit 101 can receive the operating parameters, such as the state of charge and the temperature, from the at least one battery 104, e.g., via a suitable transmission system, such as a bus system or a data bus, e.g., with a CAN or SENT protocol, e.g., via CAN bus, and/or a wireless transmission, such as a radio transmission.

The control unit 101 of the brake system 100 can use these input signals D1, D2, D3, DE1, DE2, DE3 (diagnostic messages, "keep-alive" signals and/or fault conditions and/or operating parameters) to decide whether regenerative deceleration 30 is to be used at all and to what extent and/or until the vehicle F comes to a standstill. The control unit 101 can also decide whether a vehicle F can continue driving after a first fault F1 and/or a second fault F2 in the respective brake systems 10, 20, 30 and/or in the power supplies E1, E2, E3. In addition, the control unit 101 can decide whether automatic deceleration, deceleration and/or emergency braking must be requested and/or whether the automatic deceleration, deceleration and/or emergency braking is to be carried out regeneratively using the electric motor 103 and/or via the first brake request implementation and/or via the second brake request implementation using the brake calipers.

The control unit 101 of the brake system 100 can request a control unit 102 of the electric motor 103 to carry out a regenerative deceleration 30. The control unit 101 can request a deceleration using the brake calipers from the first brake request implementation and/or from the second brake request implementation. In addition, the control unit 101 can control a driver-vehicle interface in order to inform and/or warn the vehicle user about the faults and/or to make a suggestion for the further operation of the vehicle F, such as, for example, visiting a repair shop (cf. a first warning W1 in FIGS. 2 and 3). The control unit 101 can also inform the driver about the remaining driving distance and/or the remaining driving time.

The control unit for carrying out the respective method according to the invention can be designed as a separate control unit or integrated in terms of software and/or hardware in a central control unit 110 of the vehicle F and/or in the control unit 102 of the electric motor 103 of the vehicle F. The control unit for carrying out the respective method according to the invention can also include the control unit 101 for the brake system 100.

Figure 2:
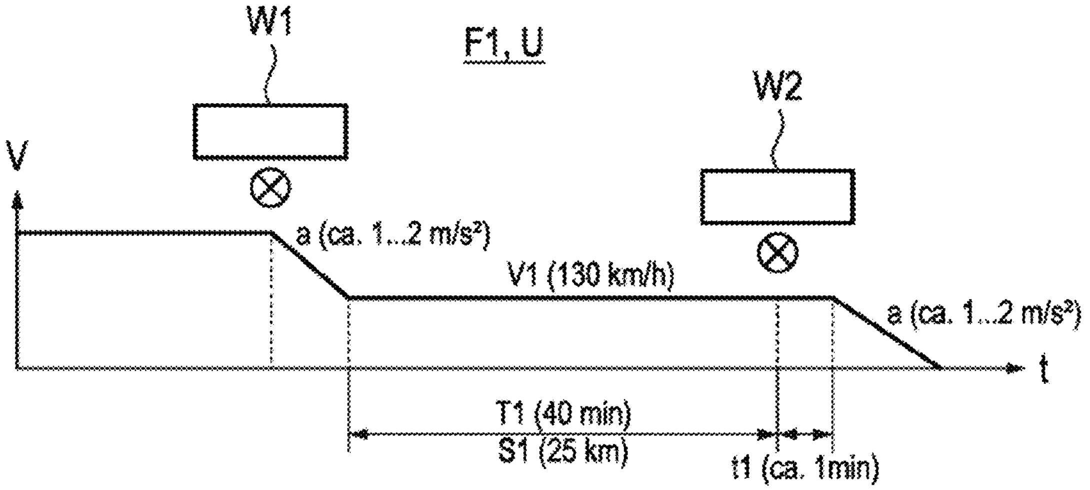
FIG. 2 shows vehicle behavior after a non-critical first fault and when a distance or time limit has been reached.
Figure 3:
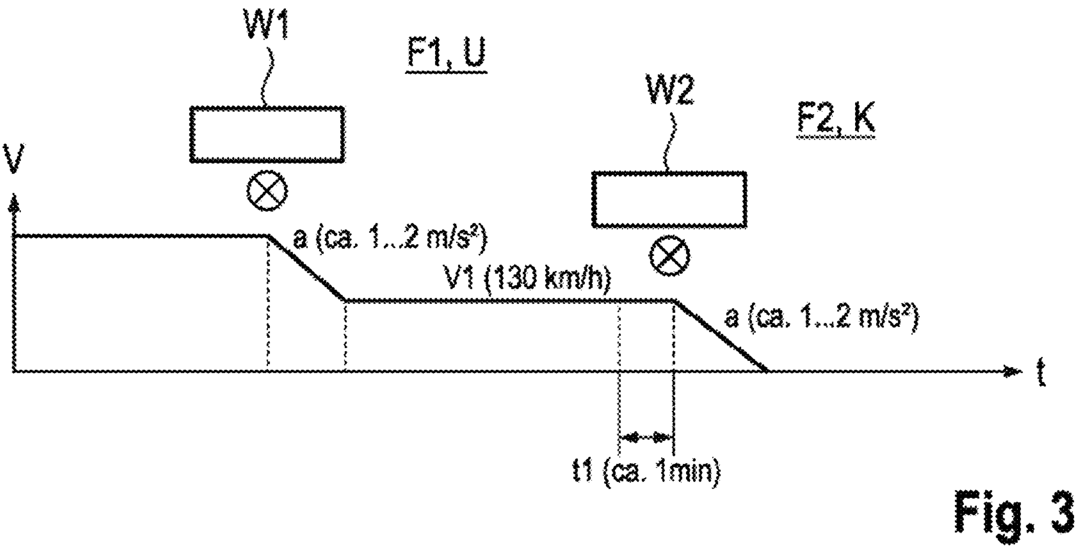
FIG. 3 shows vehicle behavior after a non-critical first fault and a critical second fault.

With the aid of FIGS. 2 and 3, the basic behavior after the first fault F1 and second fault F2, and here in particular the function "regenerative deceleration 30", if possible to a standstill, is described as the second fallback level for the brake function.

FIG. 2 shows a possible vehicle behavior after a non-critical U first fault F1 without a subsequent second fault F2 using a function of a velocity V of the vehicle F as a function of the time t. After a non-critical U first fault F1, the user of the vehicle F can receive a first warning W1, e.g., "visit repair shop". However, the vehicle F can continue to drive T1 (see FIG. 2) for a limited time T1 (e.g., 40 min) or for a limited distance S1 (e.g., 25 km), in particular at a limited speed V1 (e.g., 130 km/h). The onward journey of the vehicle F is therefore limited in order to avoid a so-called "complete breakdown" of the vehicle F, which would be unsafe and/or uncomfortable for the user of the vehicle F. A "complete breakdown" can mean that the vehicle F can no longer drive to a repair shop on its own and must therefore be towed.

If no further critical K fault F1, F2 occurs during the onward journey of the vehicle F, then the user of the vehicle F is warned again shortly before, during or after reaching the time limit T1 or the distance limit S1. A second warning W2, e.g. "stop immediately", may be issued.

If the user of the vehicle F does not react to the second warning W2, e.g. within a timer t1 (e.g., of approx. 1 min), then the vehicle F is automatically decelerated, preferably by means of a regenerative deceleration 30, preferably moderately, e.g., at speeds V between approx. 1 $m/s^2$ and approx. 2 $m/s^2$, preferably to a standstill.

An automatic, preferably regenerative deceleration 30 of the vehicle F is initiated, because an indefinite onward journey of the vehicle F after a first fault F1 in the brake-by-wire system is not safe.

FIG. 3 shows a possible vehicle behavior after a non-critical U first fault F1 and a critical K second fault F2 using a function of a velocity V of the vehicle F as a function of the time t.

If, after a non-critical U first fault F1, a critical K second fault F2 occurs during the onward journey of the vehicle F, then the user of the vehicle F can be warned again. For this purpose, a second warning W2, e.g., "stop immediately", can be issued. Subsequently, the vehicle F is automatically decelerated by a regenerative deceleration 30, preferably moderately, e.g., at speeds between approx. 1 $m/s^2$ and approx. 2 $m/s^2$, if possible to a standstill.

A second fault F2 in the brake-by-wire system is critical when, after a subsequent third fault, the vehicle F cannot be decelerated to a standstill either by the user of the vehicle F or automatically. It is then no longer possible for the vehicle F to continue its journey. The following examples are conceivable: The primary brake system 10 and the secondary brake system 20 fail, or the primary power supply E1 and the secondary power supply E2 fail or the like.

The simultaneous failure of the primary brake system 10 and the secondary brake system 20 is detected by the control unit 101 of the brake system 100. This can be done, for example, in the absence of a "keep-alive" signal and/or a corresponding diagnostic message, cf. the input signals D1, D2, D3, DE1, DE2, DE3 (diagnostic messages, "keep-alive" signals and/or fault conditions and/or operating parameters) in FIG. 1.

In this situation, the central control unit 110 of the vehicle F can request automatic deceleration of the vehicle F from the control unit 102 of the electric motor 103 via a regenerative deceleration 30, which is implemented by the electric motor 103 and leads to the charging of at least one battery 104, in particular a high-voltage battery, preferably a traction battery, and possibly at least one other auxiliary battery.

The invention provides a method for stopping the vehicle or for holding the vehicle at a standstill, especially after the function "regenerative deceleration 30" has been activated, e.g., as a second fallback level in the brake-by-wire system.

In the context of the invention, one can speak of a failure in the brake system 100 or in the brake-by-wire system of the vehicle F at least when a critical K secondary fault F2 has been detected in the brake system 100 (cf. FIG. 3) or when a non-critical U fault (cf. FIG. 2) has not been resolved.

An idea of the invention is based, for example, on the fact that the electric motor 103 ensures the vehicle F does not roll. For this purpose, the electric motor 103, especially in the version as a permanently excited synchronous motor, can be switched to an active short circuit AKS, a so-called AKS. Switching to the active short circuit AKS can advantageously take place below a certain speed limit, the so-called the AKS speed limit. The AKS torque then prevents the vehicle from rolling.

Active short circuit or AKS can mean: the stator windings of the synchronous motor are short-circuited at the connecting cables, e.g., by a switch, such as an electronic switch, e.g., a field-effect transistor, such as a MOSFET transistor, which, e.g., can be provided in the sector of power electronics.

The AKS torque: When the vehicle F rolls forwards or backwards, the movement of the permanent magnet in the rotor of the synchronous motor induces a voltage in the windings of the stator. A current now flows in the short-circuited windings of the stator, which leads to an AKS torque, which counteracts the direction of rotation of the synchronous motor and thus leads to the braking of the vehicle F.

The speed limit or the AKS speed limit can mean: the AKS torque rises steeply with the speed of the electric motor 103, then reaches a maximum, and then decreases steadily. Below the AKS limit speed, the AKS torque is then so low that it is no longer sufficient to secure the vehicle F against rolling.

The advantage here is that if the vehicle F should roll from a standstill after the regenerative deceleration 30, then the maximum speed Vroll of the vehicle F when rolling is limited to a few km/h, preferably below walking speed, preferably below 1 km/h, due to the active short circuit AKS.

Another advantage is that the vehicle F is not actively held at a standstill after the regenerative deceleration to a standstill, i.e., no electricity is consumed in the process.

As an alternative solution A2, the vehicle F is actively held at a standstill after a regenerative decelerating to a standstill. This can be done, for example, by energizing at least one stator winding and/or by switching the phases of the stator windings. In this case, the permanently excited rotor of the electric motor 103 is held in the same position by energizing a phase of the stator, which prevents the vehicle F from rolling. To prevent the electric motor 103 from overheating, it is possible to switch between the phases of the stator. This results in a slight rolling motion of the vehicle F.

The vehicle F can be held at a standstill for a limited time by energizing at least one stator winding and/or by switching the phase.

With the aid of the invention, different scenarios Z (cf. FIG. 4) can be mastered depending on the topology, such as the slope of the road.

When driving on a flat roadway, the vehicle F can be operated as follows: the vehicle F is regeneratively decelerated, if possible to a standstill. The electric motor 103 of the vehicle F is then, e.g., below the AKS speed limit, switched to the active short circuit (abbrev. AKS). The AKS torque advantageously prevents the vehicle F from rolling.

It may also be provided that the rollaway protection is not interrupted when the driver presses the accelerator pedal. In principle, however, it is also conceivable that the rollaway protection is interrupted as long as the driver presses the accelerator pedal. However, it would only be possible to continue driving to a limited extent by pressing the accelerator pedal, and the steering function L can still be permitted.

When driving downhill, the vehicle F can be operated as follows: the vehicle F is regeneratively decelerated, if possible to a standstill. The electric motor 103 of the vehicle F is then, e.g., below the AKS speed limit, switched to the active short circuit AKS. The AKS torque advantageously prevents the vehicle F from rolling.

The inclination of the road can be estimated, for example, from recuperation torques.

Advantageously, rolling down from a hill is limited to a few km/h by the rolling speed of the vehicle.

Furthermore, it may be provided that the rollaway protection is not interrupted when the driver presses the accelerator pedal.

The steering function L can still be permitted. The driver can advantageously further influence the rolling direction of the vehicle F, e.g., to steer the vehicle F against an obstacle (e.g., a curb) if necessary, in order to bring the vehicle F to a standstill and hold it at a standstill.

When the downhill drive is finished, the vehicle F can again be operated as described above under "driving on a flat roadway".

When driving uphill, the vehicle F can be operated as follows: the vehicle F is regeneratively decelerated, if possible to a standstill. The electric motor 103 of the vehicle F is then, e.g., below the AKS speed limit, switched to the active short circuit (abbrev. AKS). The AKS torque advantageously prevents the vehicle F from rolling. The slope of the road can be estimated, for example, from recuperation torques. When driving uphill, the vehicle F rolls slowly e.g., at a few km/h, backwards down the mountain due to the rollaway protection. The driver can be allowed to press the accelerator pedal in order to slowly, e.g., at a few km/h, drive forward up the slope again. In this way, the situation can be made easier for the driver to control. When the downhill journey is completed, depending on the topography of the road, the vehicle can be operated as described under "driving on a flat roadway" or as described under "driving downhill".

Figure 4:
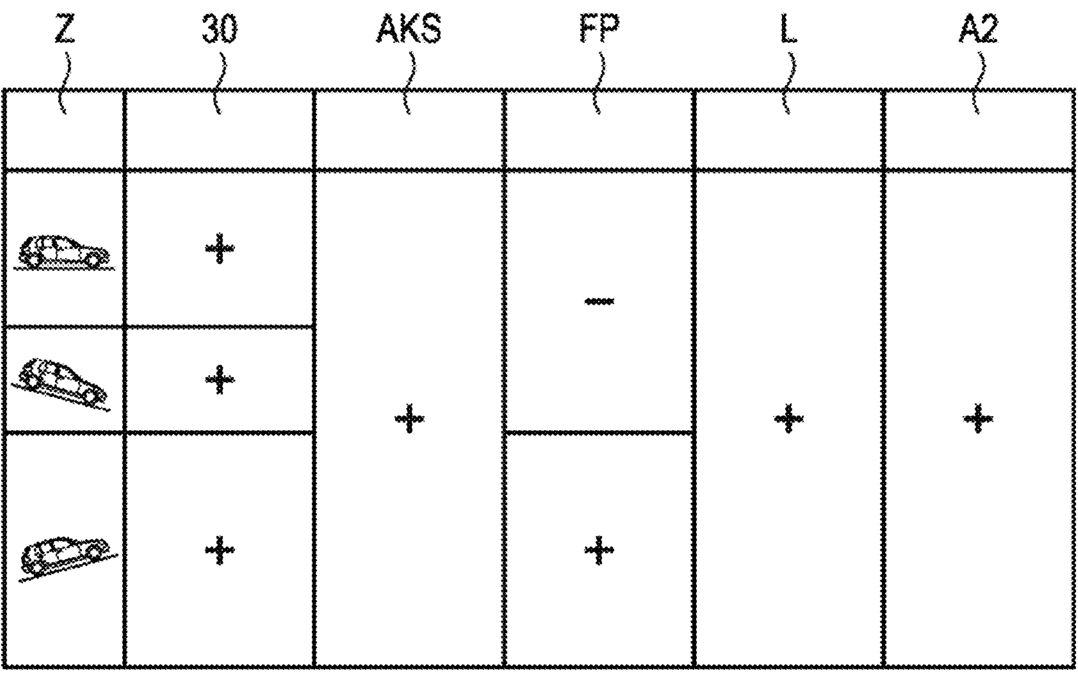
FIG. 4 shows an overview of possible uses of rollaway protection within the scope of the present disclosure.

The table in FIG. 4 shows an overview of different scenarios Z.

After switching the electric motor 103 to the active short circuit AKS, the accelerator pedal operation FP can be switched off, interrupted or not permitted (see situations "driving on a flat roadway" and "driving downhill"). In this way, it is possible to prevent the driver from switching off the rollaway protection with the aid of the electric motor 103 and accelerating the vehicle F again.

In unusual situations, such as "driving uphill", the active short circuit AKS of the electric motor 103 can be interrupted during accelerator pedal operation and accelerator pedal operation can be permitted. This can be advantageous in order not to confuse the driver and to make the situation easier or more intuitive to control.

As FIG. 4 illustrates, the accelerator pedal operation FP can be switched off or permitted depending on the topology, in particular the slope, of a road on which the vehicle F is brought to a standstill.

As FIG. 4 also illustrates, after switching the electric motor 103 to the active short circuit AKS, a steering function L of the vehicle F can be permitted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of operating a vehicle when stopping the vehicle and/or when holding the vehicle at a standstill, the vehicle comprising an electric motor, the method comprising:

decelerating the vehicle;

switching the electric motor to an active short circuit to prevent the vehicle from rolling; and limiting, when the electric motor is switched to the active short circuit, a rollaway speed of the vehicle to less than 1 km/h, wherein a regenerative deceleration is carried out to decelerate the vehicle, and wherein the switching of the electric motor to the active short circuit is carried out after the regenerative deceleration of the vehicle.

2. The method according to claim 1, wherein the regenerative deceleration is initiated automatically when a non-critical first fault in the brake system or the brake-by-wire system of the vehicle has been detected and has not been resolved, or when a critical second fault has been detected in a brake system or a brake-by-wire system of the vehicle after the non-critical first fault.

3. The method according to claim 1, wherein the electric motor is switched to the active short circuit below an active short circuit speed limit, and wherein, the active short circuit speed limit of the electric motor for switching to the active short circuit is determined depending on a weight or a load weight of the vehicle and/or a topology or a slope of a roadway on which the vehicle is brought to a standstill.

4. The method according to claim 1, wherein, when the electric motor is switched to the active short circuit, stator windings of the electric motor are short-circuited at connecting cables by a switch or an electronic switch or a field-effect transistor.

5. The method according to claim 1, wherein the vehicle is passively stopped and/or held at a standstill by switching the electric motor to the active short circuit without energizing stator windings of the electric motor.

6. The method according to claim 1, wherein, after switching the electric motor to the active short circuit, an accelerator pedal operation is switched off, or wherein the active short circuit of the electric motor is interrupted during an accelerator pedal operation, and wherein the accelerator pedal operation is switched off or permitted depending on the topology of a roadway on which the vehicle is brought to a standstill.

7. The method according to claim 1, wherein, after switching the electric motor to the active short circuit, a steering function of the vehicle is permitted.

8. The method according to claim 1, wherein the electric motor of the vehicle prevents the vehicle from rolling when switched to the active short circuit.

9. A non-transitory computer-readable medium storing a computer program thereon that, when executed by a computer, causes the computer to perform the method according to claim 1.

10. A control unit comprising a computing unit and a memory unit in which a code is stored which, when at least partially executed by the computing unit, performs the method according to claim 1.

11. A vehicle comprising the control unit according to claim 10.

12. A method of operating a vehicle when stopping the vehicle and/or when holding the vehicle at a standstill of the vehicle, the vehicle comprising an electric motor, the method comprising;

decelerating the vehicle; and energizing a stator winding of the electric motor with phase switching of stator windings of the electric motor to prevent the vehicle from rolling, wherein a regenerative deceleration is carried out to decelerate the vehicle, and wherein the energizing of the stator winding of the electric motor with phase switching of the stator windings is carried out after the regenerative deceleration of the vehicle.

13. A vehicle comprising an electric motor, wherein, by energizing a stator winding of the electric motor with phase switching of the stator windings of the electric motor, after a regenerative deceleration of the vehicle is carried out to decelerate the vehicle, the vehicle is prevented from rolling.

* * * * *